3,557,443
METHOD OF MACHINING PROPELLER CASTINGS RELATIVE TO A PLANE OF REFERENCE
John T. Parsons, 205 Wellington,
Traverse City, Mich. 49684
No Drawing. Filed Oct. 7, 1968, Ser. No. 765,674
Int. Cl. B23p *13/04*
U.S. Cl. 29—558            9 Claims

ABSTRACT OF THE DISCLOSURE

A method of machining propeller castings by retaining the blades fixed with relation to a plane of reference so that their sets of suction faces and pressure faces may be machined to desired contour by programmed machine tools. Significant steps of the method include machining the blade root junctures with the hub before establishing the plane of reference; and after establishing it, adhesively restraining one set of faces while the other set is being machined to contour relative to the plane of reference.

BACKGROUND OF THE INVENTION

This invention relates to machining of propellers, such as marine propellers, from castings which include a hub portion and plurality of blades joining the hub portion of the casting at root junctures; and relates particularly to the problem of effecting such machining in such way as to overcome warping of the blade portions as the machining progresses.

The phenomenon of warping of propeller blades as they are machined from the castings is reviewed in my Pat. No. 3,295,190, issued Jan. 3, 1967, entitled "Method of Machining Metal Castings for Screw Propellers and the Like." The problem arises principally from the fact that castings cool at an uneven rate, their surface portions more rapidly than the inner portions. Subsequent cooling of the inner portions results in such shrinkage as tends to impose compressive stresses onto portions at and near the casting surfaces, in balance with tension stresses on the inner portions. When such a casting is machined, the balance of stresses is upset; and as the compressed metal at the outer surfaces is removed, the blade portions will warp relative to the hub portion.

If, contrary to conventional design, the blades were symmetrical and the amount of material to be removed on each side was identical, the removal of material along one side would tend to result in warpage toward that side, and subsequent removal of an identical amount of material on the other side would reverse the tendency to warpage, restoring the blade portions after machining to nearly their original positions. However, marine propellers are not symmetrical but highly cambered; much material is to be removed at the junctures unequally on opposite sides of the casting.

This phenomenon has heretofore made it impossible to utilize modern procedures for contoured machining. A tape-controlled programmed milling machine, for example, can operate only relative to a predetermined fixed plane of reference. If on machining one blade surface it warps from such predetermined plane, the machining cannot continue, even though on machining of the opposite blade surface, the warpage tendency might be reversed.

BRIEF SUMMARY OF THE INVENTION

The principal objects of the present invention are to machine propeller castings expeditiously to precise contour, and to utilize for this purpose modern machining procedures, maintaining the propeller blade portions constantly in fixed position fixed relative to a plane of reference. This method permits machining by modern programmed machine tools, as well as by older methods. Other objects will be apparent from the specification which follows.

Novel steps are employed to achieve and maintain fixed coincidence with the plane of reference. One significant novel step is to machine the root junctures of all the blade portions to substantially final contour before establishing the plane of reference to machining of the remaining portions of the blades. Another significant process step is to restrain one set of faces of the blade portions, either the suction faces or the pressure faces, relative to such a plane of reference, while the other set is machined to a desired contour. Adherent restraint in the bed of nesting fixture, is the preferred method of effecting such restraint; this permits unobstructed access for machining. Then, the first-machined set of surfaces is similarly restrained, relative to the plane of reference, as the second set is presented substantially unobstructed for machining to desired contour.

The manner of utilizing these steps, and others described herein, will be apparent in the following description of the preferred embodiment of this method of machining.

DESCRIPTION OF THE PREFERRED EMBODIMENT

The configuration of marine propellers, to whose machining this method is particularly adapted, is familiar; and accordingly no drawings are necessary to convey an adequate understanding of it.

The casting for a marine propeller includes a hub portion and a plurality of blade portions extending outboard from it. The root junctures, at which the blade portions extend outward, are ordinarily much thicker in the casting than in the final blade. This excess thickness is due in part to the relatively high camber of the machined blades at their root portions, and is desirable in making the casting, to permit adequate flow of molten metal from the hub to the blades.

As pointed out in my Pat. No. 3,295,190, heretofore referred to, the removal on machining of such excess material is likely to cause warpage, and shifting of the positions of the machined blade portions. Removal of the excess material at the blade root junctures is the most serious cause of such warping and position shift, because of the depth to which the material removed, its unequal removal due to the high camber, and the magnified deflection at the blade tip accompanying even a small change in angularity at the root juncture.

Each of the blades, as machined, has a pressure face and a more highly cambered suction face. Considering these as comprising one set of substantially identical pressure faces and another set of substantially identical suction faces, each entire set of faces is, in the present invention, machined according to a fixed program designed to afford it all its requisite contours, before proceeding to machine the other set of faces according to its program.

As is conventional, a central axis is first established for and bored in the hub of the casting. Such a central axis is a basic reference, but is alone not a sufficient reference for programmed machining such as by a tape-controlled milling machine. According to the present invention, a reference plane, in reference to the central axis, must be established, and each set of faces is to be machined according to geometric coordinates with reference to it.

Before such a reference plane is established, it is preferable that the root junctures of all of the blade portions with the hub be machined to substantially final contour. Warpage may be expected at this stage, as the stresses in the material removed are released; this changes the angularity of the root junctures only minutely, but is amplified in the deflection of the outboard blade portions. Once so warped, these outboard portions will have taken positions close to their final positions.

At this stage, it may be desirable to preliminarily straighten the blade portions, by bending and setting them. The term "straightening" is here used as meaning, lessening their deviation from optimum position. Such preliminary straightening operation may render useful castings which might otherwise have to be rejected; and the step is most advantageously taken after the root junctures have been machined.

With the rough blade portions now located more closely to their final positions, the next step is to establish a plane, perpendicular to the central axis, with reference to which both the set of suction faces and the set of pressure faces of the blades are to be machined. Defining the faces of a blade as the portions on either side of a line leading around from the root juncture, out along the leading edge, around the blade tip, and back along the trailing edge to the root juncture, it follows that if on all the blades, the suction faces have an identical set of coordinates relative to the plane of reference, and all of the pressure faces have an identical set of coordinates relative to the plane of reference, by which their contours are defined, the machined blades will be identical.

One of the sets of faces is selected as the first set to be machined. Before machining them, I restrain the blade portions of the casting fixedly in position relative to the plane of reference, yet leaving substantially unobstructed the first set of faces so selected for machining. The restraint is effected preferably by the temporary adhesion, to a nesting fixture, of the set of faces opposite to that set to be machined. By the term "nesting fixture" is meant one which offers sufficient rigidity and resting surface area for adhesion to permit adhesive restraint of one set of blade surfaces, and which is so open above the nesting surface area as to permit substantially unobstructed access for machining the other set of blade surfaces. Known conventional adhesives have sufficient strength to afford the necessary restraint to such a nesting fixture, particularly where a significant part of the total warpage has already taken place by machining the blade root junctures.

The temporary adhesion is maintained throughout the machining the entire first set of faces to desired contour, which may be the substantially final contour, as measured relative to the plane of reference. If on the completion of this machining of the first set of faces, the adhesive restraint were to be released, a certain amount of further warpage would take place, disturbing the positions of the individual blade portions relative to the fixed plane of reference before the second set of faces could be machined. In the preferred procedure, the adhesion of the second set of faces is maintained, not only during the machining of the first set of faces, but thereafter until the first set of faces, so machined, has been adhered to a second nesting fixture positioned in fixed-spaced relationship to the first nesting fixture; thereby the spaced relationship to the plane of reference is maintained. Only after such second adhesion step is the first temporary adhesion released.

Release of adhesion may be effected in any manner suitable for the adhesive agent utilized; thus many adhesive agents are released by heat, which causes them to lose their strength and to flow. It may be necessary to take precautions, during such release, not to diminish the adhesive grasp to the second nesting fixture.

With the fixed relationship to the plane of reference so continued, and after removal of the first nesting fixture to leave the second set of faces relatively unobstructed, this set of faces is likewise machined over substantially their entire surface areas, to its desired contour relative to the plane of reference.

The adherence to the second nesting fixture of the first machined set of faces is then released.

If a procedure is chosen wherein the sets of faces are not machined to final contour in this first cycle of operations, the adherence of the second nesting fixture may be continued while a nesting fixture is again adherently applied to the second set of faces machined, the first set of faces released, and the cycle repeated. This continues to maintain the known fixed-spaced relationship to the plane of reference. There may be, in certain instances, reasons why such repetitive procedure might be desirable. For example, if it was considered undesirable to machine the blade root juncture initially to its final contour, a repetitive progression of such operations, from one set of faces to the other, would minimize the restraint against warpage required during any machining step.

Final release of the last nesting fixture used will permit the machined blades to assume positions in which they may be warped from the desired positions, relative to the fixed plane of reference, in which they have been machined. Each blade will, however, be precisely formed to contour. A final straightening and setting operation may then be carried out, in which the blades are set in final alignment and track.

Alternative procedures may be used to machine relative to the fixed plane of reference. For example, instead of utilizing the adherence of the set of blade faces opposite to those being machined, restraint may be by tabs integrally formed on the casting, drilled, aligned with, and secured to a rigid fixture. Where feasible, this procedure permits release from restraint relative to the plane of reference, and its re-establishment, at any stage of operations. Further, if this type of restraint be utilized when machining the second set of faces, it may be possible to dispense with restraint while machining the first set of blade surfaces. Then, if such machining proceeds inwardly from the blade tips toward the root, the warpage accompanying it will follow the progress of the machine tool. Once the first set of blade faces has been machined to contour, the warped blades are restored in fixed position relative to the plane of reference, by bolting them in place and thus bending them elastically; only after being so restored does the sequence of operations proceed to machining the second set of faces. However, the method of adhesive restraint, which maintains the fixed relation to the plane of reference during the machining of the first set of faces and thereafter as such set of surfaces is adhered to a second nesting fixture, is the preferred method to maintain fixed relation of both sets of faces, during their machining, to the plane of reference.

The present invention offers the advantages of accuracy and precision over the haphazard shaping procedures heretofore used, and permits complete final machining of identically formed sets of suction faces and pressure faces, with a minimum of hand finishing and a minimum of skill. A programmed machine tool, which can successfully operate if there is no departure from a fixed reference plane, can thus be used to multiply the rate of production of propellers to close tolerances.

From this disclosure, variations in procedure will be apparent to those familiar with the art. Accordingly, this invention is not to be construed narrowly, but rather as co-extensive with the claims.

I claim:

1. As applied to propeller castings of the type having a hub portion and a plurality of blade portions extending outboard therefrom at root junctures, the blade portions together having a set of suction faces and a set of pressure faces, the method of machining such castings, comprising the conventional step of establishing and boring a central axis in the hub, together with the steps of (1) machining all the root junctures of the blade portions to substantially final contour and permitting the blade portions outboard therefrom to warp attendant to the release of stresses accompanying such machining, then (2) establishing a plane, in reference to the central axis, with reference to which the suction faces and the pressure faces of the blade portions are to be machined, then (3) as to all blade portions of the casting, machining substantially the entire areas of a first of said sets of faces to desired contour relative to such plane of reference, then (4) restraining the blade portions fixedly in position relative to such plane of reference while leaving substantially unobstructed the second of said set of faces, then (5) machining said second set of faces to desired contour relative to such plane of reference and (6) releasing from restraint.

2. The method as defined in claim 1, together with the step, intervening before establishing the plane of reference, of
preliminarily straightening the blade portions and setting them in straightened position.

3. The method as defined in claim 1, together with the final step of
so straightening the blade portions and setting them as to restore substantially the relationship of their contours, as so machined, with the plane of reference.

4. The method as defined in claim 1, wherein prior to the step of machining said first set of faces, the intervening step is employed of
restraining the blade portions fixedly in position relative to such plane of reference, while leaving substantially unobstructed the said first set of faces.

5. The method as defined in claim 4, wherein
the desired contour to which each of said sets of blade faces is machined is substantially the final contour thereof.

6. The method as defined in claim 4, wherein
such restraint of the blade portions fixedly relative to such plane of reference, is effected by temporary adhesion to a nesting fixture of the set of faces opposite to that set to be machined.

7. The method as defined in claim 6, wherein
such temporary adhesion is applied initially to the second set of faces prior to the machining of said first set of faces, and is maintained during their machining, and wherein
such temporary adhesion is applied subsequently to the first set of faces, after the machining thereof, and is maintained during their machining.

8. The method as defined in claim 7, wherein
such temporary adhesion, prior to the machining of the first set of faces, is obtained by
positioning opposite to the first set of faces and adjacent to the second set of faces a first nesting fixture and adhering said second set of faces thereto, and wherein
such temporary adhesion, subsequent to machining of the first set of faces, is obtained by
positioning opposite to the second set of faces and adjacent to the first set of faces and in fixed-space relationship to such first nesting fixture, a second such nesting fixture, and adhering said first set of faces thereto, and wherein
such temporary adhesion to such first nesting fixture is continued until adhesion has been obtained to such second nesting fixture,
whereby the fixed-space relationship of such second nesting fixture to the first nesting fixture continues the fixed relation to the plane of reference between the steps of machining the first set of faces and machining the second set of faces.

9. An applied to propeller castings of the type having a hub portion and a plurality of blade portions extending outboard therefrom at root junctures, the blade portion together having a set of suction faces and a set of pressure faces,
the method of machining such castings, comprising the conventional step of
establishing and boring a central axis in the hub, together with the steps of
(1) establishing a plane, in reference to the central axis, with reference to which the set of suction faces and the set of pressure faces are to be machined, then (2) restraining the blade portions fixedly relative to such plane of reference, while leaving substantially unobstructed a said first set of such blade faces to be machined, by temporarily adhering the second set of such blade faces to a first nesting fixture, then (3) as to all the blade portions of the casting, machining substantially the entire areas of said first set of faces to desired contour relative to such plane of reference, then (4) similarly adhering the said first set of faces, so machined, to a second nesting fixture positioned in fixed relation to such first nesting fixture, then (5) releasing the adherence to the first nesting fixture and removing it, leaving substantially unobstructed the second of said set of faces, then (6) machining said second set of faces to desired contour relative to such plane of reference, and then (7) releasing the adherence to the second nesting fixture and removing it.

References Cited

UNITED STATES PATENTS

| 1,965,622 | 7/1934 | Weick | 29—156.8 |
| 2,110,530 | 3/1938 | Saives | 90—11 |
| 2,585,973 | 2/1952 | Stieglitz | 29—156.8X |
| 3,002,266 | 10/1961 | Lynn et al. | 29—156.8 |
| 3,295,190 | 1/1967 | Parsons | 29—156.8 |

JOHN F. CAMPBELL, Primary Examiner

V. A. D. PALMA, Assistant Examiner

U.S. Cl. X.R.

29—156.8